(12) United States Patent
MacAulay et al.

(10) Patent No.: US 7,007,568 B2
(45) Date of Patent: Mar. 7, 2006

(54) CABLE ACTUATOR FOR LUMBAR SUPPORT

(75) Inventors: Rodney Craig MacAulay, Port Melbourne (AU); Wayne Andrew Harris, Bell Post Hill (AU)

(73) Assignee: Henderson's Industries Pty Ltd., North Greelong (AU)

( * ) Notice: Subject to any disclaimer, the term of this patent is extended or adjusted under 35 U.S.C. 154(b) by 0 days.

(21) Appl. No.: 10/618,821

(22) Filed: Jul. 15, 2003

(65) Prior Publication Data

US 2005/0011299 A1    Jan. 20, 2005

(51) Int. Cl.
*F16C 1/12* (2006.01)
*A47C 3/025* (2006.01)

(52) U.S. Cl. .............. 74/501.6; 74/500.5; 74/543; 74/553; 297/284.4; 297/284.7

(58) Field of Classification Search .......... 74/500.5, 74/501.6, 505, 506, 543, 553; 297/410, 284.4, 297/284.7; 248/161

See application file for complete search history.

(56) References Cited

U.S. PATENT DOCUMENTS

| | | | |
|---|---|---|---|
| 1,987,239 A | 1/1935 | Lochrane | 123/90 |
| 2,335,000 A | 11/1943 | Edwards | 24/201 |
| 4,218,935 A | 8/1980 | Ion et al. | 74/501 |
| 4,799,400 A | 1/1989 | Pickell | 74/502.6 |
| 4,833,937 A | 5/1989 | Nagano | 74/501.5 |
| 4,847,973 A | 7/1989 | Lundeen | 29/402.08 |
| 4,854,186 A | 8/1989 | Jakob et al. | 74/501.5 |
| 4,936,161 A | 6/1990 | Polando | 74/502.6 |
| 4,969,372 A | 11/1990 | Muhlecker et al. | 74/501.5 |
| 5,039,138 A | 8/1991 | Dickirson | 285/314 |
| 5,156,063 A | 10/1992 | Kelley | 74/501.5 |
| 5,217,278 A * | 6/1993 | Harrison et al. | 297/284.7 |
| 5,220,832 A | 6/1993 | Petruccello | 74/502.4 |
| 5,293,785 A | 3/1994 | Lichtenberg | 74/500.5 |
| 5,397,164 A | 3/1995 | Schuster | 297/284.1 |
| 5,449,219 A | 9/1995 | Hay et al. | 297/284.4 |
| 5,572,907 A | 11/1996 | Kaakinen | 74/489 |
| 5,638,722 A | 6/1997 | Klingler | |

(Continued)

FOREIGN PATENT DOCUMENTS

DE    41 08 955 A1 *    5/1992

(Continued)

OTHER PUBLICATIONS

Patent No. EP0267685, Control Cable Adjuster Device, Publication Date: May 18, 1988, Inventor: Jaksic Miroslav, Applicant: Babcock Ind Inc (US), pp 1-3.

*Primary Examiner*—Vinh T. Luong
(74) *Attorney, Agent, or Firm*—Baker & Hostetler LLP

(57) ABSTRACT

The actuator has a housing with a longitudinal passage between a first end and an opening at a second end. A spindle, supported and moveable in the passage, has oppositely handed, first and second threaded portions each nearer a respective end of the housing. A first nut fixed relative to the housing is engaged with the first threaded portion. The spindle is rotated and moved relative to the first nut by a handle at the housing first end. A second nut fixed against rotation relative to the housing and engaged with the second threaded portion moves relative to and in the same direction as the spindle as the spindle rotates. The second nut is connectable through the opening to a device, and the spindle is rotatable by the handle for adjusting the device by movement of the spindle and the second nut.

20 Claims, 6 Drawing Sheets

U.S. PATENT DOCUMENTS

| | | | |
|---|---|---|---|
| 5,797,652 A | 8/1998 | Darbyshire | |
| 6,053,064 A | 4/2000 | Gowing et al. | |
| 6,345,549 B1 | 2/2002 | Lance | |
| 6,357,826 B1 * | 3/2002 | Gabas et al. | 297/284.4 |
| 6,520,580 B1 | 2/2003 | Hong | |
| 6,668,679 B1 | 12/2003 | McMillen | |
| 6,883,867 B1 | 4/2005 | Klingler | 297/284.4 |
| 2003/0106970 A1 | 6/2003 | McMillen | |

FOREIGN PATENT DOCUMENTS

| | | | |
|---|---|---|---|
| EP | 0 0006 840 | * | 6/1979 |
| WO | WO 99/15356 A1 | | 4/1999 |
| WO | WO 03/050426 A1 | | 6/2003 |

* cited by examiner

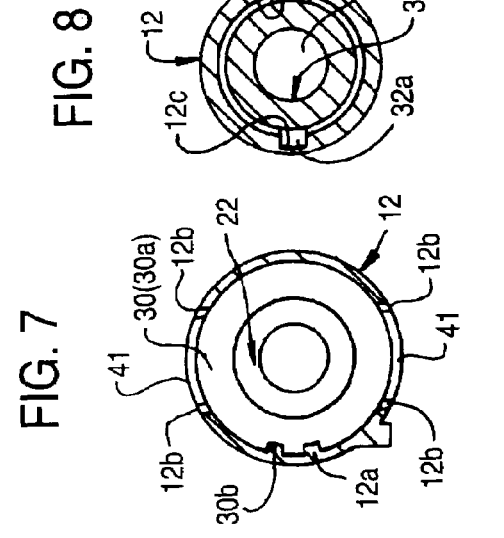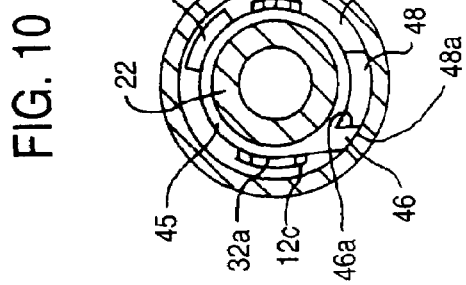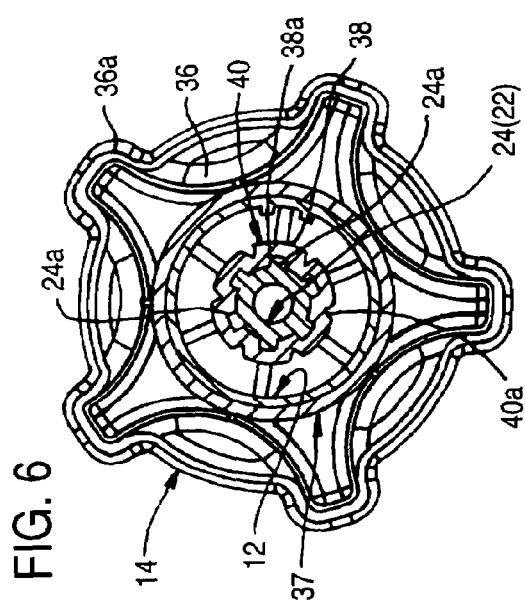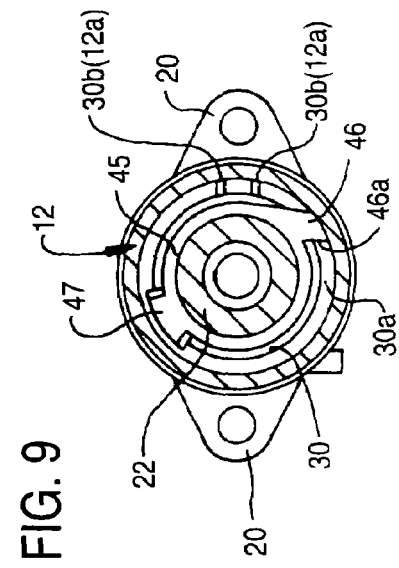

CABLE ACTUATOR FOR LUMBAR SUPPORT

FIELD OF THE INVENTION

This invention relates to an adjustment device, hereinafter referred to as an actuator, suitable for adjusting the operating position of another device, such as a lumbar support, either directly or by means of a Bowden cable system.

BACKGROUND OF THE INVENTION

Bowden cable systems are used in a wide variety of applications. One application is in adjusting a lumbar support built into a seat, such as a seat of an automotive vehicle. The Bowden cable system has a wire cable extending through a sleeve. The sleeve usually is held stationary at each end, enabling relative longitudinal movement between it and the cable. An actuator coupled to one end of the cable is able to move the cable reversibly, longitudinally through the sleeve, to enable reversible application of a force to a device, such as a lumbar support, coupled to the other end of the cable. The Bowden cable system is relatively inexpensive. Also, of importance in automotive applications, it is able to operate quietly, while its flexibility enables its use in situations of limited available space.

A number of different forms of actuator have been proposed for use with a Bowden cable system. Examples are shown by U.S. Pat. No. 5,638,722 to Klingler; U.S. Pat. No. 6,053,064 to Gowing et al; and U.S. Pat. No. 6,520,580 to Hong. In each case, the actuator/Bowden cable system combination is disclosed in relation to a lumbar support for an automotive vehicle seat, a principal application for the actuator of the present invention.

The actuator disclosed in U.S. Pat. No. 5,638,722 to Klingler has a threaded spindle which is guided in axial movement in a tubular housing, but with torsional strength on a guide. One end portion of the spindle projects from the housing and comprises a threaded ring with which a nut of an adjustment handle is in threaded engagement. At their ends remote from the handle, each of the spindle and housing respectively has a radial opening, an axial bore and a radial slot connecting the opening and bore. With the spindle moved axially to bring the radial openings into alignment, a nipple on the end of a cable of a Bowden system can be inserted into the spindle. As the slots are in a common plane, the cable then can be secured by moving it through the slots, into the aligned bores to retain the nipple within the spindle. At the remote end, the housing has an extension in which an end of the sleeve of the cable system is received and locked. The cable is able to be reversibly moved longitudinally with the spindle, by rotating the handle and its nut.

In U.S. Pat. No. 6,053,064, Gowing et al discloses an actuator which, in terms of the disclosure of Klingler as detailed above, is essentially the same. However, Gowing et al proposes a separate barrel, fixedly coupled to the end of the housing remote from the handle, for fixing the Bowden system sleeve. This necessitates the cable being passed through a bore in the barrel before its nipple is fitted, while the barrel is simply abutted by the sleeve. The arrangement of Gowing et al differs further in proposing a thread stop coupled with its screw or spindle to prevent the screw from being moved completely out of the nut. Additionally, the nut has a tubular extension which projects away from the screw, with the tubular extension coupled to and rotatable with a handle by a spline coupling therebetween provided by inter-fitting key elements and slots.

As with the actuator of Klingler, the actuator of Gowing et al has a threaded spindle or screw guided for axial movement, but with torsional strength on a guide. That is, in each case, the screw or spindle is constrained against rotation. In Gowing et al, this is shown by diametrically opposite feet or lugs on the spindle or screw locating in axially extending grooves in the housing. This of course prevents twisting of the cable, as is highly desirable, particularly as twisting in one direction would act to untwist the strands of which the cable is made.

U.S. Pat. No. 6,520,580 to Hong discloses an actuator which essentially is the same as that of Klingler. As in Gowing et al, the express disclosure is of a nut and handle arrangement with a splined coupling therebetween. The arrangement of Hong proposes a coil spring within the housing and through which the cable of the Bowden system extends to the spindle or screw. As with the barrel of Gowing et al, this complicates coupling and uncoupling of the actuator and cable system.

The present invention seeks to provide an improved actuator which, while retaining some of the benefits of the prior art discussed above, also enables additional benefits to be obtained.

SUMMARY OF THE INVENTION

In accordance with the present invention, there is provided an actuator connectable to and for adjusting an adjustable device, wherein the actuator comprises: a housing having a longitudinal passage extending between a first end and a second end of the housing and defining an opening at or adjacent to the second end;

a spindle supported in the housing and movable longitudinally in the housing passage, the spindle having two oppositely handed, longitudinally spaced threaded portions of which a first threaded portion is nearer to the first end and a second threaded portion is nearer to the second end;

a first threaded nut fixed relative to the housing and threadedly engaged with the first threaded portion of the spindle;

a handle rotatably mounted at the first end of the housing, the handle being coupled to the spindle for rotating the spindle in the first nut and thereby moving the spindle longitudinally relative to the first nut and the housing;

a second nut fixed against rotation relative to the housing and threadedly engaged with the second threaded portion of the spindle, whereby in response to rotation of the spindle by the handle the second nut is movable longitudinally in the housing passage relative to the spindle, in the same direction as movement of the spindle relative to the housing; and connecting means on or of the second nut and connectable, through the opening defined by the housing, to an adjustable device to be adjusted by the actuator, wherein the spindle is rotatable by the handle for adjusting the adjustable device by longitudinal movement in the same direction of the spindle relative to the housing and of the second nut relative to the spindle.

The connecting means on or of the second nut can take a variety of forms. In a first embodiment the actuator is connectable to an adjustable device by means of a Bowden cable system. That is, the actuator is indirectly connectable to the adjustable device, albeit in a manner which permits considerable freedom as to how the cable system is arranged and where the actuator is mounted relative to the adjustable device. In that first embodiment, the actuator further comprises:

an opening formed in the second nut and configured for receiving and securing an end of a cable of a Bowden cable system and thereby comprising the connecting means; and the housing at the second end having an engagement member for fixing a sleeve of the Bowden cable system;

wherein the spindle is operable for moving the cable longitudinally through the sleeve for adjusting the adjustable device to which the other end of the Bowden cable system is connected.

In a second embodiment, the actuator is connectable to an adjustable device by a direct coupling between the second nut and the adjustable device. Thus, the second nut may be coupled to the adjustable device by a projection which extends laterally of the second nut, through the opening defined by the housing, with that opening being in the form of an elongate slot extending longitudinally along the housing at the second end. Preferably there is a respective such projection and elongate slot at each of opposite sides of the second nut and housing.

In the second embodiment, the connecting means may be at least one such projection. The projection may be formed integrally with the second nut, or be connected to the nut such as by screw threaded engagement in a lateral, threaded bore defined by the second nut. Where there is a respective projection at each of opposite sides of the second nut, the projections may comprise opposite end portions of a single member such as a pin, shaft or rod which extends through a diametral lateral bore defined by the second nut. The single member may be glued or welded to the second nut, or in threaded engagement in the lateral bore. In each case, the at least one projection is adapted to be coupled to the adjustable device exteriorly of the housing, such as by a pivotal coupling between the projection and the device.

Alternatively, the at least one projection may be defined by the adjustable device, with the connecting means adapted to enable the projection to be connected to the second nut. In such alternatives, the connecting means may comprise a lateral bore defined by the second nut and in which an end of the projection is engageable, such as by screw threaded engagement or by being held captive in the bore against retraction therefrom.

The actuator of the present invention is able to use a thread pitch for each threaded portion and the respective nut which makes the actuator easier to operate, or to enable a greater range of movement for the adjustable device per revolution at a given thread pitch, or to provide a combination of these benefits. This is because the distance the adjustable device is moved is the aggregate of the longitudinal distance moved by the spindle relative to the housing, and the longitudinal distance moved by the second nut relative to the spindle. Thus, for the same given thread pitch for each threaded portion of the spindle, the distance through which the adjustable device is able to be moved is twice the distance moved by the spindle relative to the housing. Thus, there is greater scope for selection of the thread pitch for ease of operation, or to achieve a required movement of the adjustable device per revolution of the spindle, or a combination of these results. Also, while it generally is beneficial for the thread of each threaded portion of the spindle to have a common pitch, this is not necessary. That is, for each revolution of the spindle, the longitudinal distance moved by the second nut relative to the spindle may be greater or less than the longitudinal distance moved by the spindle.

The handle and spindle are rotatable in unison. The handle may be mounted to the housing and held against movement longitudinally with respect to the housing. In that case, a coupling between the handle and the spindle is to be such as to enable the spindle to adjust longitudinally relative to the handle as the spindle moves longitudinally with respect to the housing. To enable this, an end portion of the spindle at the first end of the housing preferably is movable longitudinally within a sleeve defined by the handle, with there preferably being a key and keyway or splined coupling between the handle sleeve and the spindle. However, the handle may be mounted to the spindle, rather than the housing, with the handle able to move longitudinally with the spindle, as the spindle moves longitudinally in the housing passage while being rotated by the handle.

The first nut may be a friction fit in the housing, or it may be a snap-fit so as to locate behind a slight protrusion defined in the housing. In each case, the first nut preferably is insertable into the passage of the housing from the first end of the housing. The housing may define at least one radially extending shoulder, such as of at least part-annular form, against which the first nut locates when in its required position longitudinally of the housing. The first nut may have an outer periphery which is non-circular in cross-section, such as square or hexagonal, and which is complementary to the form of the cross-section of the part of the passage along which the first nut is movable to its required position, such that the first nut is constrained against rotation. However, both the first nut and that part of the passage preferably are of circular cross-section, with the nut having at least one radial projection which is slidable in a longitudinal slot defined by the housing along that part of the passage. The first nut preferably has at least two angularly spaced radial projections, each slidable in a respective slot defined by the housing.

The second nut preferably has two longitudinally adjacent sections. The first of these sections is an internally threaded sleeve by which the second nut is engaged with the second threaded portion of the spindle. The second section of the second nut extends longitudinally beyond the spindle from the first section, towards the second end of the housing. In each embodiment, the connecting means preferably is provided in the second section of the second screw. Thus, for example, in the case of an indirect arrangement using a Bowden cable system, the opening in the second nut is formed in the second section and preferably opens laterally. Also, the second section preferably defines a radial slot extending from the lateral opening towards the second end of the housing whereby, with the nipple of the cable of the Bowden system received in the lateral opening, the cable can be adjusted so as to extend longitudinally from the second nut.

The second section of the second nut, apart from defining an opening configured for receiving and securing the end of the cable of the Bowden system, may be of solid form. However, this is not essential and, for example, a passage defined by the internally threaded sleeve of the first section of the second nut may continue through the second section. Where the configured opening opens laterally, it may extend through to the passage.

The second nut also may have an outer periphery which is non-circular in cross-section, such as square or hexagonal, and which is complementary to the form of the cross-section of the part of the passage along which the second nut is movable relative to the spindle, such that the second nut is constrained against rotation. However, both the second nut and that part of the passage preferably are of circular cross-section, with the second nut having at least one radial projection which is slidable along a longitudinal slot defined by the housing along that part of the passage. The second nut preferably has at least two angularly spaced radial projections, each slidable in a respective slot defined by the housing. The slot for a radial projection of the second nut preferably is the same radial plane as the slot for a radial projection for the first nut, although the respective slots preferably are not longitudinally in line with each other.

Adjacent to its second end, the housing of an actuator for use with a Bowden cable system also may define a side opening communicating with the passage, and a slot extending from the opening to the second end. Thus, as the cable is adjusted so as to extend longitudinally from the second nut, it also is able to be adjusted to extend through the second end of the housing. For this, it is necessary that the respective side openings and slots of the second nut and the housing be brought into longitudinal and radial alignment, as taught by the disclosure of U.S. Pat. No. 5,638,722 to Klingler. However, other arrangements are possible. For example, prior to affixing a nipple to the end of the cable of the Bowden system, the cable can be passed longitudinally through the housing, from the second end to the first end, and the nipple then affixed to the cable before the cable is secured to the second nut.

The housing may be of elongate form. It preferably is able to receive therein, from the first end, an assembly comprising the spindle with each of the first and second nuts screwed onto the respective first and second threaded portions of the spindle. Prior to installation of the assembly, the nuts may be at one or other of first and second extreme positions along the threaded portions. In the first, preferred one of those positions for installation, the assembly may be such that when installed in the housing the spindle is at its extreme position near to the first end of the housing with the first nut at the end of the first threaded section which is nearer to the second end of the housing, and with the second nut at the end of the second threaded section which is nearer to the first end of the housing. Thus, the second nut is at a minimum longitudinal spacing from the first nut. In the second position, the assembly is such that when installed in the housing, the spindle is at its extreme position nearer to the second end of the housing, with the first nut at the end of the first threaded section nearer to the first end of the housing and the second nut at the end of the second threaded section nearer to the second end of the housing, and the nuts at a maximum longitudinal spacing from each other. However, as will be appreciated, the assembly once installed, is reversibly adjustable between those extremes, with the second nut able to move relative to the spindle in the same direction as the spindle is moved relative to the housing.

The housing may be of a form such that its passage, apart from longitudinal grooves for preventing rotation of the first and second nuts, is of a substantially uniform, preferably circular, cross-section. However, as detailed later herein, a region of the spindle between the two threaded sections may have at least one lateral projection. To accommodate this, and to minimise material usage, the housing may have a form such that its passage has a larger cross-section over that part of its length from the inlet end to a furthest longitudinal position from the inlet end travelled by such projection as the spindle moves longitudinally, than its cross-section from that position to the second end.

The engagement member at the second end of the housing may be a small sub-housing adapted to receive therein a suitably shaped termination of the sleeve of the Bowden system. The sub-housing may have a part cylindrical peripheral wall which defines a lateral opening through which at least part of the termination is receivable, such as by a snap fit. Preferably such peripheral wall is provided with an inwardly extending flange or bead at its edge remote from the housing which serves to retain the termination from longitudinal disengagement from the actuator.

The spindle is of elongate form, and has three principal longitudinal sections. These include the first and second threaded sections while a third section is the part of the spindle with which the handle is coupled. The handle remains coupled to the third section as the spindle moves longitudinally. Thus if, as preferred, the spindle moves longitudinally with respect to the handle, the third section needs to be of at least comparable length to the length of the first threaded section. Assuming the same thread pitch for each of the threaded sections, each of the three sections can comprise about one third of the length of the spindle. However, the third part can be shorter if the handle is attached to the spindle for both rotational and longitudinal movement with the spindle.

The spindle is rotatable with the handle. However, in moving longitudinally relative to the first nut as it rotates, the spindle may either be movable longitudinally relative to the handle or the handle may be movable longitudinally with the spindle. Where the spindle is movable longitudinally relative to the handle, the handle preferably has a central hub in which the third section of the spindle is located and is longitudinally movable. The handle is coupled by the hub to the third section in a manner enabling relative longitudinal movement therebetween. Thus, the third section of the spindle may be of non-circular cross-section and be receivable in a passage defined by the hub which is of complementary cross-section, or the hub and third section may define longitudinally adjustable key elements and slots, or a splined coupling. Alternatively, one of the third section of the spindle and the hub may define an elongate longitudinal slot in which a pin or peg on the other of the third section and hub is located to enable the required extent of relative longitudinal movement. Where the handle and spindle are longitudinally movable together, they may be bonded together (after fitting the first nut), or permanently or releasably secured together by screw threaded engagement, lateral pins, or the like.

In addition to its coupling to the spindle, the handle may have a sleeve which fits over the first end of the housing. Where the spindle is longitudinally movable relative to the handle, the sleeve may be a snap fit onto the first end of the housing in a manner which releasably retains the handle against longitudinal movement relative to the housing. However, where the handle is longitudinally movable with the spindle, the sleeve may simply be telescopically received over the first end of the housing for relative movement therebetween.

In addition to the features detailed, the handle can take a variety of forms. It may include a transverse lever integral with the hub and sleeve. Alternatively it may be a wheel or disc co-axial with the hub and sleeve. Preferably the handle has a scalloped edge form to define a plurality of spokes extending radially outwardly around the hub and sleeve, with a respective arcuate web between each successive pair of spokes.

With the actuator adjusted so that the assembly comprising the spindle and the first and second nuts is in the first extreme position, hereinafter referred to as the "on" position, the spindle is retracted away from the second end of the housing to the first end, and the second nut is similarly retracted along the second threaded section of the spindle so as to be in its position closest to the first nut. Thus, the cable of a Bowden system secured to the second nut will have been tensioned and pulled into the housing, through the engagement member and the second end. The actuator is in the "on" position because the cable tension will have moved a device to which the other end of the cable is connected from a rest position, or from a position to which it is biased, to an active or on position. Thus, where for example the other end of the cable is connected to a lumbar support, the actuator in the "on" position holds the support in its most forwardly advanced supporting position. Conversely, with the actuator in the other extreme position, herein referred to as the "off" position, the spindle and the second nut will have moved towards the second end of the housing, releasing tension on the cable and enabling the device to return to rest or biased position.

The "on" position preferably is sharply defined, by an abutment surface at the end of the spindle near to the second end of the housing being contacted by an abutment surface defined within the sleeve section of the second nut. The abutment at the end of the spindle may be provided by an abrupt termination of the thread of the second threaded portion, rather than the usual threaded termination. The abrupt termination may extend substantially radially in a plane substantially parallel to the axis of rotation of the spindle, while the abutment surface of the second nut is similarly disposed and opposed to the thread termination when the "on" position is attained.

The spindle may have a short unthreaded part of its length between adjacent ends of the threads of the first and second threaded sections. it is at this unthreaded part that it is convenient to provide abutment means which provides a sharply defined stop with the actuator in its "off" position. For this, the spindle may have a lateral projection at the unthreaded part, with the projection having an abutment face which makes surface to surface contact with an abutment face defined by the housing when the spindle reaches the "off" position. The abutment face of the spindle is somewhat radial and leads in the direction of helical advance of the spindle as it rotates and moves longitudinally towards the second end of the housing to its longitudinal location for the "off" position. The abutment face defined by the housing is similarly disposed but oppositely facing for good surface to surface contact between the abutment faces. While the respective abutment surfaces are substantially radially disposed, it is preferred that they are inclined slightly to the radial such that the outer edge of the spindle abutment surface leads in the direction of spindle rotation to the "off" position. This inclination brings the abutment surfaces into more positive face to face engagement in the event of excessive torque being applied to the spindle, thereby minimising the risk of the spindle abutment being able to be forced radially within the housing abutment and jamming of the actuator. This risk preferably is further reduced by the spindle having a spacer which projects laterally from the unthreaded part of the spindle, at a location diametrically opposed to the abutment face of the spindle. The spacer has a lateral extent such that it bears against the housing to prevent lateral displacement of the spindle sufficient to enable the spindle abutment to pass radially within the housing abutment.

The foregoing explanation of operation of an actuator according to the first embodiment using a Bowden cable system, in terms of movement between "on" and "off" positions, is similarly applicable to an actuator of the second embodiment which is directly connectable to an adjustable device. Thus, with the connecting means connected to a location on the adjustable device, that location is caused to move with the second nut with adjustment of the actuator between the "on" and "off" positions. The nature of the adjustment of the adjustment device will vary with its form and its disposition relative to the longitudinal extent of the actuator.

BRIEF DESCRIPTION OF THE DRAWINGS

The accompanying drawings illustrate preferred embodiments of the actuator of the present invention. The detailed description of the drawings is to assist with an appreciation of the construction and function of the actuator. In the drawings:

FIG. 6 is a transverse sectional view taken on line VI—VI of FIG. 5;

FIG. 7 is a transverse sectional view taken on line VII—VII of FIG. 5;

FIG. 8 is a transverse sectional view taken on line VIII—VIII of FIG. 5;

FIG. 9 is a transverse sectional view taken on line IX—IX of FIG. 5;

FIG. 10 is a transverse sectional view taken on line X—X of FIG. 5; and

DETAILED DESCRIPTION OF THE PREFERRED EMBODIMENTS

Figure 1:
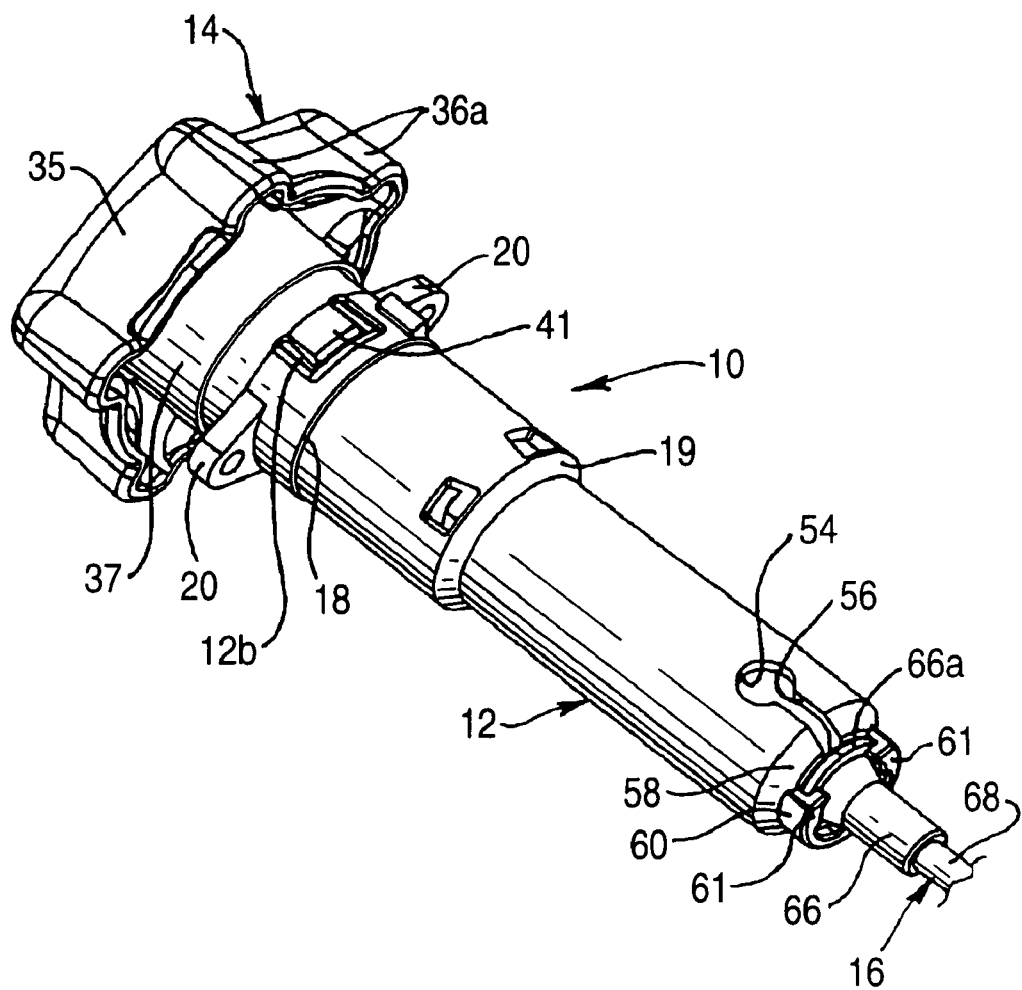
FIG. 1 is a perspective view of a first embodiment of an actuator according to the present invention.

With reference to FIGS. 1 to 5, the actuator 10 shown therein has an elongate cylindrical housing 12, of circular cross-section, which has a handle 14 at one end and receives one end of a Bowden cable system 16 at the other end. From its first end, at which handle 14 is provided, housing 12 defines a passage 13 which has a maximum diameter through to a first step 18, an intermediate diameter from step 18 to a second step 19, and a minimum diameter from step 19 through to the second end through which system 16 is received. Adjacent to handle 14, housing 12 has two diametrically opposed lugs 20 by which actuator 10 is able to be mounted on a suitable support, such as a side frame of a vehicle seat. In the context of a vehicle seat, the end of system 16 remote from actuator 10 may be connected to an adjustable device to be adjusted or actuated through system 16 by actuator 10. The device at the remote end may, for example, be a lumbar support mounted within the seat-back.

Figure 4:
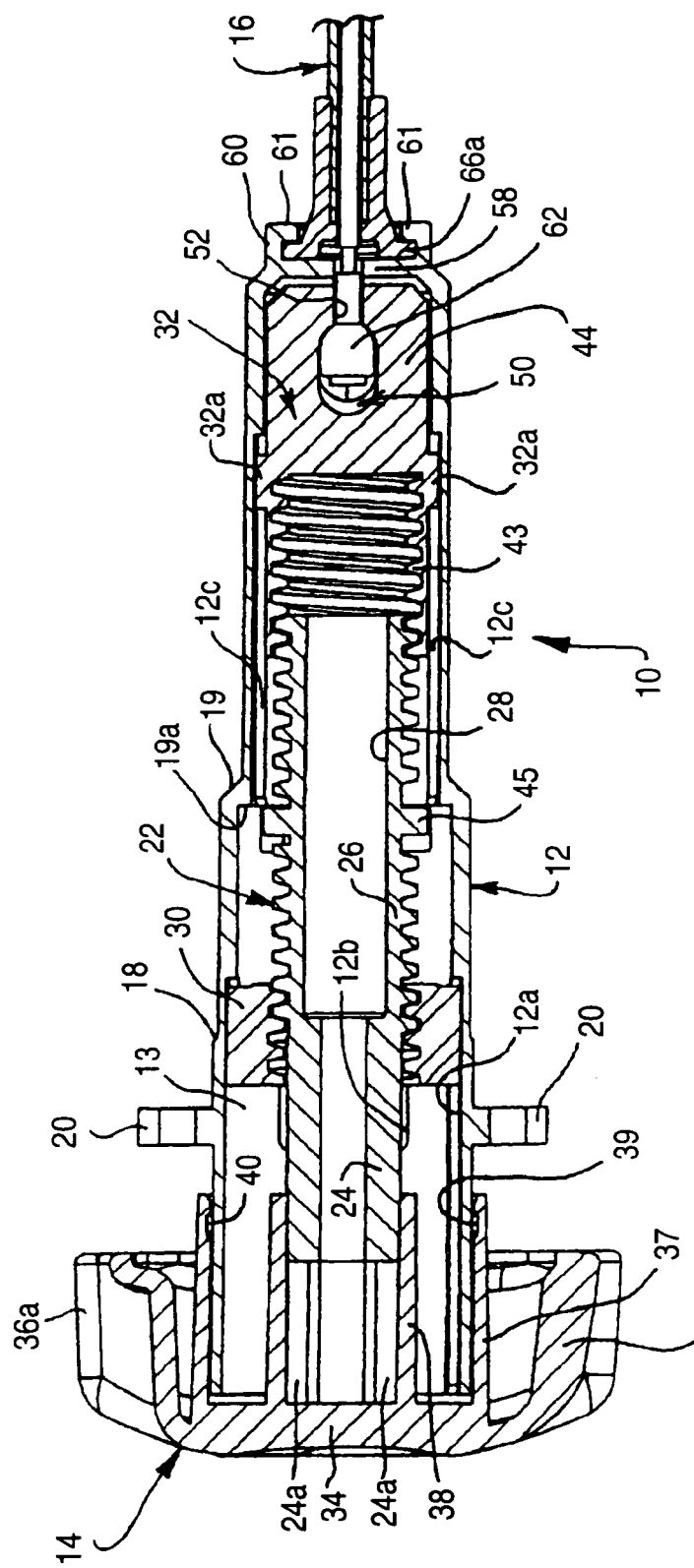
FIG. 4 is a full sectional view of the device of FIG. 1, in the first condition shown in FIG. 2.
Figure 5:
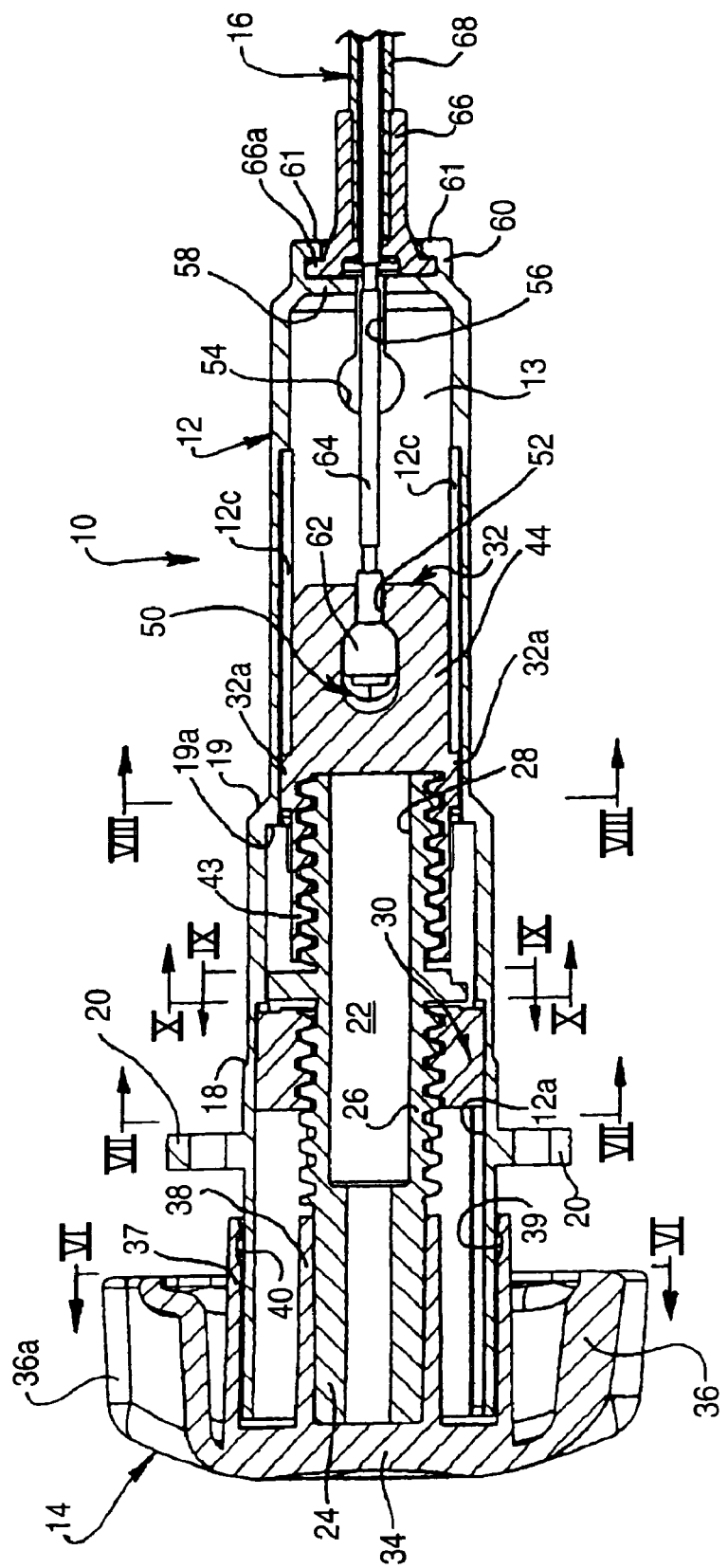
FIG. 5 is similar to FIG. 4, but shows the actuator in the second condition of FIG. 3.

As seen most clearly in FIGS. 4 and 5, actuator 10 includes an elongate spindle 22 within passage 13 of housing 12. The spindle 22 has a handle engaging portion 24 at the first end of housing 12, followed in turn by a first externally threaded portion 26 and a second externally threaded portion 28. Of the threaded portions 26,28, the first is nearer to the first end, while the second is nearer to the second end, of housing 12. Also within housing 12, there is a first nut 30 with which first portion 26 of spindle 22 is in threaded engagement, and a second nut 32 with which second portion 28 of spindle 22 is in threaded engagement. Preferably the thread of each of the portions 26 and 28 has substantially the same pitch.

The handle 14 has a transverse end wall 34 around the circumference of which there is a skirt 36. The skirt 36 has angularly spaced protrusions 36a which assist a user to grip and rotate handle 14. Concentrically within skirt 36, handle 14 has a sleeve 37 which is neatly received over the first end of housing 12. Within sleeve 37, handle 14 has a central sleeve 38 in which portion 24 of spindle 22 is received.

The handle 14 is releasably and rotatably retained on the first end of housing 12. This is by a peripheral groove 39 defined around the internal surface of sleeve 37 engaging on a continuous or discontinuous bead 40 defined around the external surface of housing 12. The handle 14 also is coupled to spindle 22 in a manner such that rotation of handle 14 causes rotation of spindle 22, while allowing spindle 22 to move longtitudinally in passage 13 relative to housing 12 and handle 14. As shown most clearly in the sectional view of FIG. 6, the portion 24 of spindle 22 has an angularly spaced array of longitudinal ribs 24a which are slidable in a complementary angularly spaced array of longitudinal grooves 38a defined by the inner surface of sleeve 38. The grooves 38a comprise keyways for inter-fitting ribs 24a to act as keys or a splined coupling between sleeve 38 and spindle 22 and thereby cause spindle 22 to rotate with handle 14, while allowing the spindle to move longitudinally with respect to handle 14 to vary the extent to which portion 24 of spindle 22 projects into sleeve 38.

The first nut 30, over a first part of its axial extent as it is received into passage 13 from the first end, is a neat fit within the intermediate diameter section of passage 13 of housing 12 between steps 18 and 19. A trailing part of its axial extent as it is so received defines a flange 30a which is a neat sliding fit in the maximum diameter section of passage 13 up to step 18. As seen most clearly in FIG. 7, nut 30 has longitudinal grooves 30b in its flange 30a, in which longitudinal ribs 12a of housing locate. Thus, nut 30 is secured against rotation. Also, as seen most clearly in FIG. 1, housing 12 at each of diametrically opposite location, has a U-shape groove 12b cut therethrough to define a resilient tab 41. Each tab 41 is deformed inwardly into passage 13 so that, once nut 30 has been longitudinally moved into position within passage 13, from the first end of housing 12, the tabs 41 locate behind flange 30a of nut 30 and hold unit 30 against a shoulder 42 defined in passage 13 at step 18 and also restrain nut 30 against unintended retraction. The situation is such that, in addition to being held against rotation, nut 30 is held against longitudinal movement. Thus, when rotated by handle 14, spindle 22 is caused by its threaded engagement with nut 30 to move longitudinally along passage 13 in a direction determined by the direction of rotation.

The second nut 32 is threaded onto the second threaded portion 28 of spindle 22 and is a neat sliding fit in the minimum diameter section of passage 13 between step 19 and the second end. The nut 32 has two longitudinally adjacent sections, comprising an internally threaded sleeve 43 by which nut 32 is engaged on portion 28 of spindle 22, and a section 44 located beyond the free end of portion 28. As shown in FIG. 8, nut 32 has a projection 32a at each of opposed sides, with each projection located in a respective groove 12c defined along the minimum diameter length of passage 13. Thus, nut 32 is constrained against rotation relative to housing 12, but is able to move longitudinally therein.

The thread of the respective portions 26 and 28 of spindle 22 are of opposite hand. That is, when spindle 22 is viewed from one end, the thread of one of portions can be seen to be clockwise, while the other is anti-clockwise. Thus, with rotation of spindle 22 by handle 14, spindle 22 moves longitudinally along passage 13 with respect to housing 12, while the second nut 32 moves longitudinally relative to spindle 22 and in the same direction as spindle 22.

Figures 2, 3:
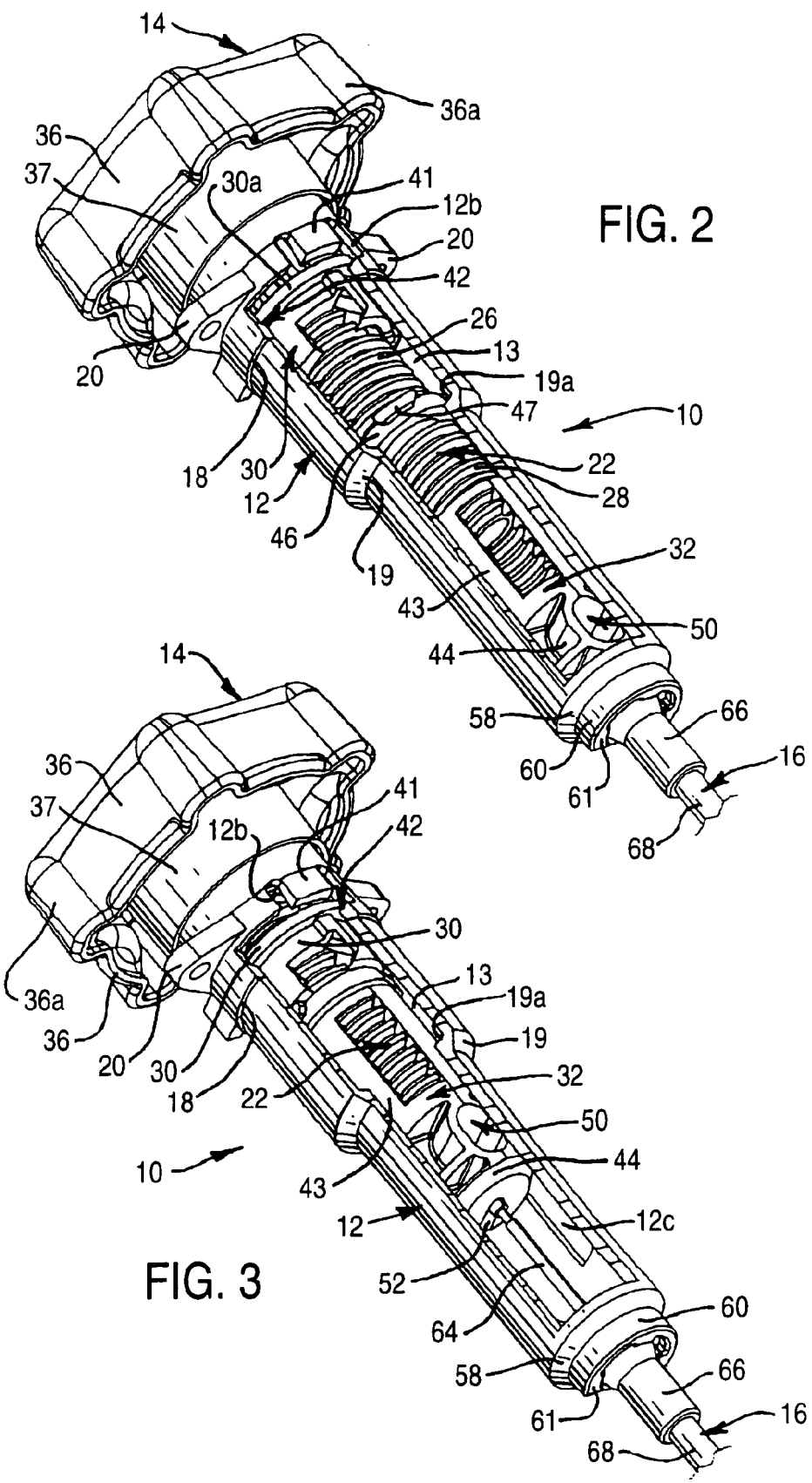
FIG. 2 is a partly cut-away perspective view of the actuator of FIG. 1, but taken from the opposite side and showing the actuator in a first condition.
FIG. 3 is similar to FIG. 2, but shows the actuator of the first embodiment in a second condition.

With rotation of handle 14, the actuator 10 can be moved between two extreme positions. The first of those positions, shown in FIGS. 2 and 4 is herein designated as the "off" position, while the other of the positions is shown in FIGS. 3 and 5 and is designated as the "on" position. To attain the "off" position, spindle 22 is rotated so as to move longitudinally along passage 13, relative to and towards the second end of housing 12. Spindle 22 rotates relative to the fixed first nut 30 and, in being rotated by handle 14, is caused by its threaded engagement with nut 30 to move longitudinally. As second nut 32 is constrained against rotation relative to housing 12, spindle 22 rotates relative to nut 32, while the threaded engagement between spindle 22 and nut 32 causes longitudinal movement of nut 32 relative to housing 12 and also relative to spindle 22. As the threaded engagement between spindle 22 and nut 32 is of opposite hand to the threaded engagement between spindle 22 and nut 30, nut 32 moves relative to housing 12 in the same longitudinal direction as spindle 22. Thus, nut 32 also moves to the second end of housing 12. The distance moved by nut 32 is the distance it moves relative to spindle 22 plus the distance spindle 22 moves relative to housing 12.

The "on" position, shown in FIGS. 3 and 5, is attained by reversal of the direction of rotation of handle 14. This causes spindle 22 to move relative to housing 12 towards the first end, with nut 32 moving in the same longitudinal direction relative to spindle 22.

Movement of spindle 22 towards its "on" position may be terminated on attaining that position by the leading end of portion 24 of spindle 22 contacting the inner surface of end wall 34 of handle 14 (as shown in FIG. 5). This, of course, is subject to spindle 22 not providing a force sufficient to displace handle 14 from housing 12 by disengaging groove 39 and bead 40. Movement of spindle 22 towards its "off" position is terminated on attaining that position, shown in FIG. 4, by an arrangement best understood by reference to FIGS. 9 and 10. As can be seen from FIGS. 4, 5, 9 and 10, spindle 22 has a circumferential flange 45 located around the junction between its respective threaded portions 26 and 27. At each of diametrically opposed locations, flange 45 has a respective outwardly extending tab 46,47 which serve respective purposes. The tab 46 has a side 46a which leads in the direction of rotation as spindle 22 is rotated towards the "off" position. At the "off" position, side 46a abuts against an end surface 48a defined by a short arcuate bead 48 formed around and against a shoulder 19a defined in passage 13 at step 19. The side 46a is inclined slightly with respect to a plane containing the rotational axis of spindle 22, such that the radial outer edge leads slightly in rotation to the "off" position. This assists in ensuring that the spindle 22 is not able to move longitudinally beyond the "off" position, by preventing lateral deflection of spindle 22 to permit tab 46 to pass radially within bead 48. The tab 47 also assists in this regard, in that it limits the freedom for spindle 22 to deflect laterally.

Rather than longitudinal movement of spindle 22 being terminated on attaining the "on" position by the end of portion 24 of spindle 22 contacting the inner surface of wall 34 of handle 14, it is preferred that a gap be retained between that end of portion 24 and wall 34. To enable this, longitudinal movement of spindle 22 on attaining the "on" position may be terminated by the threaded engagement between second nut 32 and second threaded portion 28 of spindle 22. Thus, the end of the respective threads of nut 32 and portion 28, at the end of each nearer to the second end of housing 12, may define a respective end face similar in form and action to side 46a of tab 46 and surface 48a of bead 48, with the end faces abutting to terminate longitudinal movement of spindle 22 at the "on" position.

The section 44 of nut 32 has a transverse opening 50 extending diametrically therethrough. Also, as best seen in FIG. 3, and able to be appreciated from FIGS. 4 and 5, there is a radial slot 52 cut in nut 32 which extends from the outer surface to the centreline of nut 32 and from opening 50 to the free end of nut 32.

At the second end of housing 12, there is a lateral opening 54. The location of opening 54 is such that, with actuator 10 in its "off" position, opening 54 is laterally in-line with the end of opening 50 of nut 32 at which slot 52 is provided. Also, from opening 54, housing 12 defines a slot 56 which extends to, and radially across, an end wall 58 of housing 12. With actuator 10 in its "off" position, slot 56 is in line with slot 52 of nut 32. Also, beyond end wall 58, housing 10 has a part cylindrical extension 60 which has radial tabs 61 spaced around and extending inwardly from its free edge.

With actuator 10 in its "off" position of FIGS. 2 and 4, Bowden cable system 16 is able to be connected to or disconnected from actuator 10. For connection, a nipple 62 at the free end of cable 64 of the system 16 is able to be presented radially through opening 54 of housing 12 and into opening 50 of nut 32. The cable 64 then is able to be moved through the slots 52 and 56 so as to extend longitudinally beyond the second end of housing 12, with nipple 62 held captive in opening 50. As the cable 16 is moved to this position, a termination 66 at the end of sleeve 68 of system is able to be located in and retained by an engagement member comprising wall 60 and its tabs 61. As shown, the termination 66 has a peripheral flange 66a which is a snap fit within wall 60 from which it is held against longitudinal extraction by tabs 61. With the system 16 secured in relation to actuator 10, operation of actuator 10 by rotation of handle 14, to change from the "off" position to the "on" position results in the cable 64 being pulled through sleeve 68 and longitudinally within housing 12, along passage 13. As spindle 22 moves along passage 13 towards the first end of housing 12, with its portion 24 received further into sleeve 38 of handle 14, nut 32 is drawn onto portion 28 of spindle 22. Thus, cable 64 is drawn along passage 13 by the combined action of spindle 22 moving relative to housing 12 and nut 32 moving relative to spindle 22. Accordingly, the distance cable 64 is able to be drawn along passage 13 is the total distance moved by nut 32 due to those combined actions.

Figure 11:
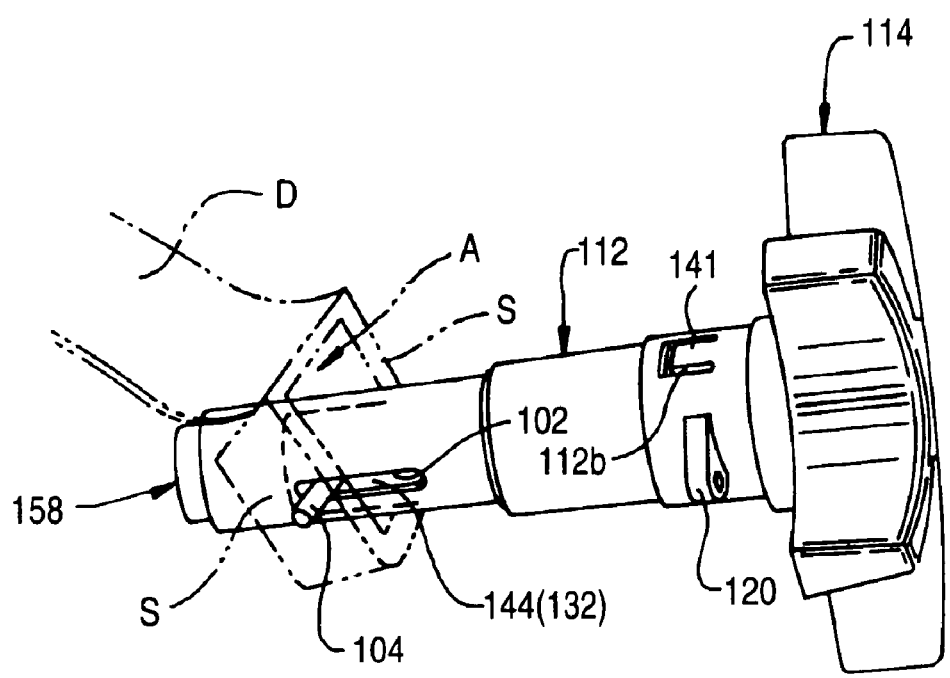
FIG. 11 is a perspective view of a second embodiment of an actuator according to the present invention.

FIG. 11 shows a second embodiment of an actuator 110 according to the present invention. Parts of actuator 110 corresponding to those of actuator 10 of FIGS. 1 to 10 have the same reference numeral, plus 100. Also, actuator 110 is substantially the same as actuator 10, in both its form, operation and functioning, except as detailed herein. Thus, for actuator 110, there is shown its housing 112 with lugs 120 and first nut retaining tab 141 defined by U-shaped slot 112b, as well as its handle 114.

While the actuator 10 of FIGS. 1 to 10 is intended for connection to an adjustable device, such as a vehicle seat lumbar support. via a Bowden cable system, the actuator 110 of FIG. 11 is adapted for direct connection to the adjustable device. As shown in FIG. 11, the housing 112 of actuator 110 is able to be closed at the second end by its end wall 158. However, adjacent to the second end, housing 112 defines two diametrically opposed elongate slots 102. Additionally, part 144 of the second nut 132 does not necessitate a lateral opening and slot, corresponding to opening 50 and slot 52 of actuator 10, for receiving the nipple and cable of a Bowden system. Rather, part 144 of nut 132 has a respective projection 104 extending laterally through each slot 102.

The projections 104 provide means by which the actuator 110 is able to be operatively connected to an adjustable device. An end part D of such device is shown in broken outline in FIG. 11. In the arrangement illustrated, the second end of actuator 110 extends into an aperture A of device D, between side portions S. Each projection 104 is journalled in a respective portion S of device D. The arrangement is such that, as actuator 110 is operated to move its spindle (not shown) and nut 132 between the "on" and "off" positions, projections 104 move along slots 102 with movement of nut 132. This results in the end part D of the adjustable device being moved, such as to apply or release tension in, and thereby adjust, the adjustable device. Where the device is a lumbar support. having one end connected to one side of a vehicle seat-back frame, and its other end D connected to an actuator 110 mounted on the other side of the frame, the support can be adjusted to increase or decrease, respectively, the level of lumbar support provided to an occupant of the seat.

Operation with actuator 10 of FIGS. 1 to 10 can be similar. However, of course, adjustment of an adjustable device by actuator 10 is by movement transmitted via the Bowden cable system 16.

The projections 104 may be formed integrally with part 144 of nut 132. However, this would require that part D of the adjustable device is split, to enable projections 104 to be received therein, in the arrangement illustrated. Alternatively, the projections 104 may comprise a respective or common pin, bolt or the like separable from part 144 and securable in a lateral bore defined by part 144 after being inserted through part D. Such separable projection 104 may be securable in part 144 by screw threaded engagement in the lateral bore, or by any other suitable means.

In a variant on the embodiment of FIG. 11, the part 144 of nut 132 may have a lateral bore, or oppositely opening lateral bores, and not include projections such as shown at 104. With that variant, each side S of end part D of an adjustable device may have an integral projection locatable in a respective lateral bore of part 144. Alternatively, each side S may define a bore through which a pin or bolt is able to be secured, with the pin or bolt journalled in the transverse bore of part 144. In that alternative, there may be a respective pin or bolt for each side S, or part 144 may have a single through bore in which a common pin or bolt for each side S is journalled. That is, the through bore may be similar to opening 50 of actuator 10 of FIGS. 1 to 10, but there need not be a slot similar to slot 52 of actuator 10 associated with the through bore.

Finally, it is to be understood that various alterations, modifications and/or additions may be introduced into the constructions and arrangements of parts previously described without departing from the spirit or ambit of the invention.

What is claimed is:

1. An actuator connectable to and for adjusting a device, wherein the actuator comprises:
    a housing having a longitudinal passage extending between a first end and a second end of the housing and defining an opening at or adjacent to the second end;
    a spindle supported in the housing and movable longitudinally in the housing passage, the spindle having two oppositely handed, threaded portions longitudinally spaced from each other with respect to an axis the spindle rotates about of which a first threaded portion is nearer to the first end and a second threaded portion is nearer to the second end;

a first threaded nut fixed relative to the housing and threadedly engaged with the first threaded portion of the spindle;

a handle rotatably mounted at the first end of the housing, the handle being coupled to the spindle for rotating the spindle in the first nut and thereby moving the spindle longitudinally relative to the first nut and the housing;

a second nut fixed against rotation relative to the housing and threadedly engaged with the second threaded portion of the spindle, whereby in response to rotation of the spindle by the handle the second nut is movable longitudinally in the housing passage relative to the spindle, in the same direction as movement of the spindle relative to the housing; and connecting means on or of the second nut configured to be connected, through the opening defined by the housing, to a device to be adjusted by the actuator;

wherein the spindle is configured to rotate by the handle for adjusting the device by longitudinal movement in the same direction of the spindle relative to the housing and of the second nut relative to the spindle.

2. The actuator of claim 1, wherein the actuator is for connection to the device by a direct coupling between the second nut and the device, by a projection which extends laterally of the second nut, through the opening defined by the housing, with that opening being in the form of an elongate slot extending longitudinally along the housing at the second end.

3. The actuator of claim 2, wherein the coupling is provided by a respective said projection projecting through a respective said elongate slot at each of opposed sides of the second nut and housing.

4. The actuator of claim 2, wherein the projection extends from the second nut and comprises the connecting means.

5. The actuator of claim 1, wherein each threaded portion has a thread of a substantially common pitch.

6. The actuator of claim 1, wherein the handle is mounted on the housing and held thereon against longitudinal movement relative to the housing, and wherein a coupling between the handle and the spindle enables the spindle to adjust longitudinally relative to the handle as the spindle moves longitudinally with respect to the housing.

7. The actuator of claim 6, wherein an end portion of the spindle at the first end of the housing is configured to move longitudinally within a sleeve defined by the handle, and wherein there is a key and keyway or splined coupling between the sleeve of the handle and the spindle.

8. The actuator of claim 1, wherein the first nut is held against rotation by a key and keyway engagement with the housing.

9. The actuator of claim 1, wherein the first nut is held against movement longitudinally of the housing by being located between a shoulder and at least one tab, and wherein the shoulder is defined by the housing and faces towards the first end and the at least one tab is formed integrally with the housing and protruding resiliently into the passage.

10. The actuator of claim 1, wherein the second nut has first and second longitudinally adjacent sections, of which the first section comprises an internally threaded sleeve by which the second nut is engaged with the second threaded portion of the spindle and the second section extends longitudinally beyond the spindle from the first section, towards the second end of the housing.

11. The actuator of claim 1, wherein the second nut is of substantially circular cross-section and has at least one radial projection which is slidable along a longitudinal slot defined by the housing along a part of the passage along which the second nut is movable relative to the spindle.

12. The actuator of claim 1, wherein the spindle has an unthreaded part of its length between adjacent ends to the threads of the first and second threaded portions, with said unthreaded part having abutment means for providing a sharply defined stop when the spindle and the second nut are moved towards the second stop to respective limiting positions.

13. The actuator of claim 12, wherein said abutment means is provided by a lateral tab projecting from the spindle, with the lateral tab having a leading face in the direction of rotation of the spindle for movement towards the second end, and the abutment means is adapted to stop rotation of the spindle by said abutment face abutting a surface defined by the housing.

14. The actuator of claim 1, wherein the first and second nuts are internally threaded and have no external threads.

15. The actuator of claim 1, wherein the first and second nuts have substantially the same diameter.

16. An actuator connectable to and for adjusting a device, wherein the actuator-comprises:

a housing having a longitudinal passage extending between a first end and a second end of the housing and defining an opening at or adjacent to the second end;

a spindle supported in the housing and movable longitudinally in the housing passage, the spindle having two oppositely handed, longitudinally spaced threaded portions of which a first threaded portion is nearer to the first end and a second threaded portion is nearer to the second end;

a first threaded nut fixed relative to the housing and threadedly engaged with the first threaded portion of the spindle;

a handle rotatably mounted at the first end of the housing, the handle being coupled to the spindle for rotating the spindle in the first nut and thereby moving the spindle longitudinally relative to the first nut and the housing;

a second nut fixed against rotation relative to the housing and threadedly engaged with the second threaded portion of the spindle, whereby in response to rotation of the spindle by the handle the second nut is movable longitudinally in the housing passage relative to the spindle, in the same direction as movement of the spindle relative to the housing; and connecting means on or of the second nut and configured to connect, through the opening defined by the housing, to a device to be adjusted by the actuator;

wherein the spindle is rotatable by the handle for adjusting the device by longitudinal movement in the same direction of the spindle relative to the housing and of the second nut relative to the spindle;

wherein the actuator further comprises:

an opening formed in the second nut and configured for receiving and securing an end of a cable of a Bowden cable system and thereby comprising the connecting means; and the housing at the second end having an engagement member for fixing a sleeve of the Bowden cable system;

wherein the spindle is operable for moving the cable longitudinally through the sleeve for adjusting the adjustable device to which the other end of the Bowden cable system is connected.

17. The actuator of claim 16, wherein the second nut has first and second longitudinally adjacent sections, of which the first section comprises an internally threaded sleeve by which the second nut is engaged with the second threaded portion of the spindle and the second section extends longitudinally beyond the spindle from the first section, towards the second end of the housing; and wherein the opening comprising the connecting means is formed in and opens laterally of the second section and the second section further defines a radial slot which extends from the lateral opening towards the second end of the housing whereby, with the nipple of the cable of the Bowden system received in the lateral opening, the cable can be adjusted so as to extend longitudinally from the second nut.

18. The actuator of claim 17, wherein the housing defines a side opening communicating with the passage and a slot extending from the side opening to the second end whereby a cable adjusted so as to extend longitudinally from the second nut also is able to be adjusted to extend through the second end of the housing.

19. The actuator of claim 16, wherein the engagement member at the second end of the housing is a sub-housing adapted to receive therein a suitably shaped termination of the sleeve of the Bowden system.

20. The actuator of claim 19, wherein the sub-housing has a part cylindrical peripheral wall which defines a lateral opening through which at least part of the terminator is configured to receive, and an inwardly extending flange or bead at an edge of the wall remote from the housing for retaining the termination from longitudinal disengagement from the actuator.

* * * * *

UNITED STATES PATENT AND TRADEMARK OFFICE
CERTIFICATE OF CORRECTION

| | | |
|---|---|---|
| PATENT NO. | : 7,007,568 B2 | Page 1 of 1 |
| APPLICATION NO. | : 10/618821 | |
| DATED | : March 7, 2006 | |
| INVENTOR(S) | : Rodney Craig MacAulay et al. | |

It is certified that error appears in the above-identified patent and that said Letters Patent is hereby corrected as shown below:

<u>Column 13</u>

Line 18, please insert --and-- after "nut";

Line 25, please insert --adapted-- after "is".

Signed and Sealed this

Twenty-fifth Day of July, 2006

JON W. DUDAS
*Director of the United States Patent and Trademark Office*